Figure 1:
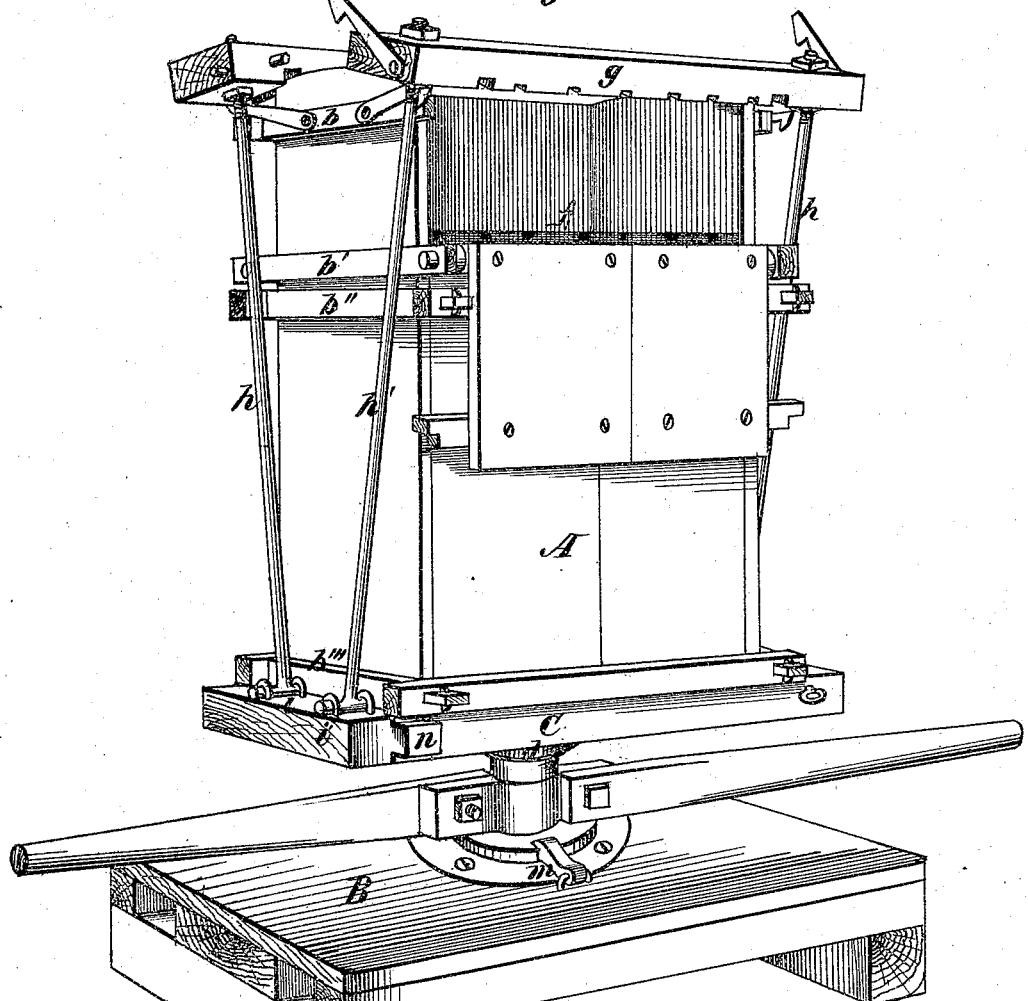

W. D. LEAVITT.

Improvement in Cotton-Presses.

No. 130,728. Patented Aug. 20, 1872.

Witnesses.
L. F. Olmstead
H. N. Jenkins.

Inventor.
W. D. Leavitt.

UNITED STATES PATENT OFFICE.

WILLIAM D. LEAVITT, OF NEW ORLEANS, LOUISIANA.

IMPROVEMENT IN COTTON-PRESSES.

Specification forming part of Letters Patent No. 130,728, dated August 20, 1872.

I, WILLIAM D. LEAVITT, of the city of New Orleans and State of Louisiana, have invented certain Improvements in Cotton Presses, of which the following is a specification, reference being had to the drawing annexed forming a part thereof.

My improvement has for its primary object the compressing of cotton to any degree or extent, limited only by the strength of the materials of which the compressing apparatus is composed. For general purposes, however, it is intended to be more especially applicable to the ordinary uses of a planter's baling-press, and as such to be simple but effective in its operations in practice.

With my invention I am enabled to compress a bale of cotton in much less time, with the same labor, than is required with most of the presses in general use; hence, I accomplish what, to the great cotton-producing interests of the South, as well as to other cotton-producing countries, are very important results—namely, the saving of labor and expense; therefore, my invention becomes of great value not only to the cotton-planter but to the public generally.

It is likewise equally important to the planter and the public that cotton should be sent to market properly and perfectly baled, whereby it is secured from unnecessary waste and delivered at its destination in good condition. My improvement, while it accomplishes all of the above desirable results, is of simple and easy construction, while at the same time it is durable as well as economical in its cost of manufacture. While my device is intended principally as a cotton-press, it is likewise equally applicable and efficient for the purpose of baling hay, moss, hemp, or any other material for which a baling-press may be made available.

My press is designed to be worked either by hand or animal power, but for all ordinary purposes as a planter's baling-press animal power is the most desirable for practical operations. It may be made of wood and metal or of all metal, but it is preferable to make it of both these materials combined, as will be perceived by reference to the drawing annexed, which amply illustrates its several and separate parts, a careful examination of which will make this specification more clearly understood, and on which—

Figure 2:
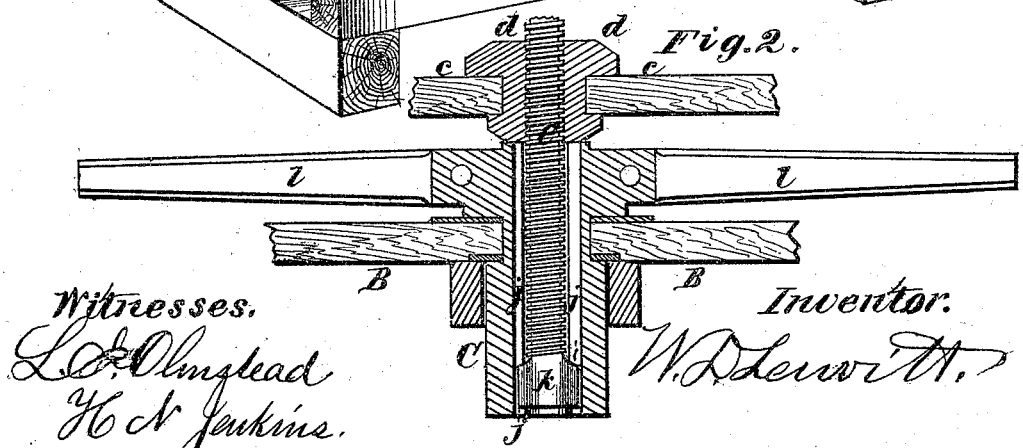

Figure 1 represents a perspective view of my press as when complete and ready for use, while Fig. 2 is a sectional view of a portion of the lower part of my device. As will readily be perceived my improvement consists mainly of an upright, truncated packing press or box, constructed of heavy timbers or planks, and surrounded or banded at intervals of its elevation by heavy and substantial framing-timbers to secure the said pressing-box from spreading laterally when the bale of cotton is being subjected to the pressure of the follower within, which is worked by means of the revolutions of the screw or of the pressing-box thereon, by the hand or animal power applied for this purpose.

The upright packing-press is shown at A, and the timber frame-bands above mentioned which surround the same by $b\ b'\ b''\ b'''$. The superstructure thus described rests upon a heavy horizontal timber base, $c$, through the center of which is placed the screw-nut $d$, provided both above and below the said timber-base $c$ with annular collars or flanges, as shown in the section at Fig. 2, for the purpose of affording a means of securing the said screw-nut $d$ firmly and rigidly in position. Through the said screw-nut $d$ runs the screw $e$, upon the upper end of which is placed the follower $f$, which is grooved in the usual manner to receive the bands or ropes employed to secure the cotton when relieved from the press. The platen $g$ is likewise grooved upon its lower face for a similar object, and is furthermore divided longitudinally into two parts, each of which is firmly held against the pressure to which it will be subjected in practice, by means of strong iron rods $h\ h'$ connecting the said platen $g$ with the horizontal timber-base $c$ above mentioned. These rods are connected at their lower extremities with eyebolts $i$, as shown, in such a manner as to allow them to articulate or oscillate freely at the said points of connection while the parts of the platen $g$ are being swung to one side for the purposes of making an opening at the top of the pressing-box for the reception of the cotton or other materials to be pressed. The arrangement of all the rods and bolts above mentioned is such that when subjected to strain in practice the tension is in the direction of their length, and hence they do not impinge laterally against the timbers through which they pass and thereby subject them to the liability of splitting, as is too frequently the case with most of the presses in general use. The strong timber bed-frame B supports the whole of the above-described superstructure, as likewise the sleeve C, through which the screw runs, and which is provided upon its inner periphery with vertical grooves $j$, in which the pin or plate $k$, which passes through the lower extremity of the screw, slides and thus admits of the elevation or depression of the said screw, and of its compulsory revolutions simultaneously with that of the sleeve C by the power applied to the draft-shafts $l$ connected therewith. When it may be desired to effect the operations of pressing by elevating or depressing the screw by means of revolving the pressing-box A, the pawl or pin $m$ should be used to lock the sleeve C with the bed-frame B, and thereby prevent the said sleeve C from turning, and the draft-shafts in that case will necessarily have to be placed within the shoes $n$ attached to the lower band-frame of the pressing-box. For general practice, however, this mode of operation will scarcely be desirable, as it will be found in practice more expedient to retain the pressing-box in permanent position, so that while the follower $f$ may be descending, by a reversal of the screw the operatives at the same time may be repacking the pressing-box and thereby save time and expense.

Having described my improvement, what I desire to secure by Letters Patent is the following:

Claims.

1. The herein-described baling-press provided with a divided or double platen, $g$, the separate parts of which are connected with the horizontal frame $c$ by parallel rods $h$ and eyebolts $i$, as and for the purposes specified.

2. The box A provided with shoes $n$, sleeve C, when formed with vertical grooves $j$, screw E, having at its lower section the pin or plate K, and pawl $m$, the same being so combined and arranged as to permit of the press being operated by the revolution of either the box or screw, substantially as described.

W. D. LEAVITT.

Witnesses:
 H. N. JENKINS,
 L. I. OLMSTEAD.